Dec. 1, 1953  P. L. GOINS  2,661,038
MACHINE FOR MAKING HAMMER HANDLES
Filed Feb. 21, 1949  5 Sheets-Sheet 1

INVENTOR.
Perry L. Goins
BY Victor J. Evans & Co.
ATTORNEYS

Fig. 2.

Dec. 1, 1953 P. L. GOINS 2,661,038
MACHINE FOR MAKING HAMMER HANDLES
Filed Feb. 21, 1949 5 Sheets-Sheet 3
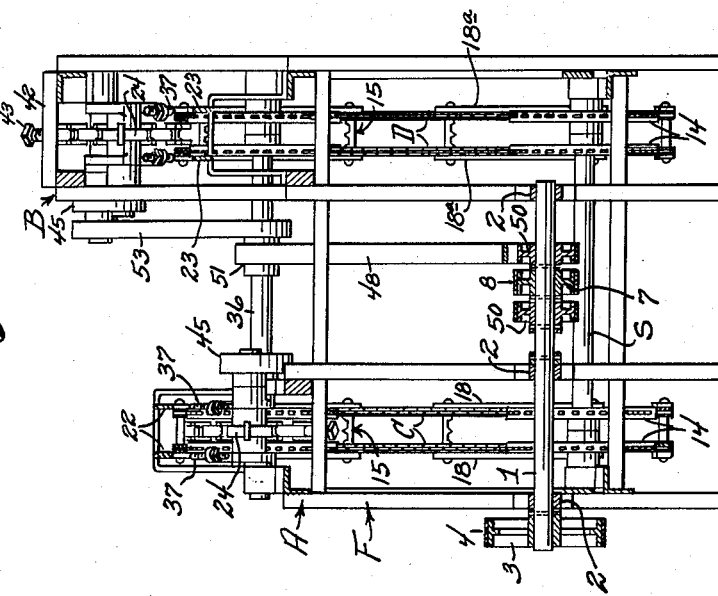
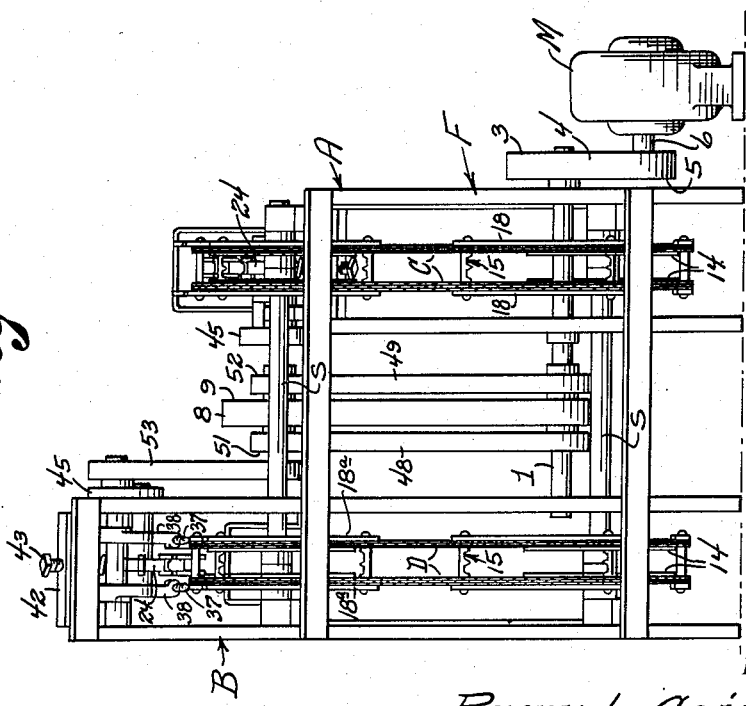
INVENTOR.
Perry L. Goins
BY Victor J. Evans & Co.
ATTORNEYS Dec. 1, 1953 P. L. GOINS 2,661,038
MACHINE FOR MAKING HAMMER HANDLES
Filed Feb. 21, 1949 5 Sheets-Sheet 4

INVENTOR.
Perry L. Goins
BY Victor J. Evans & Co.
ATTORNEYS

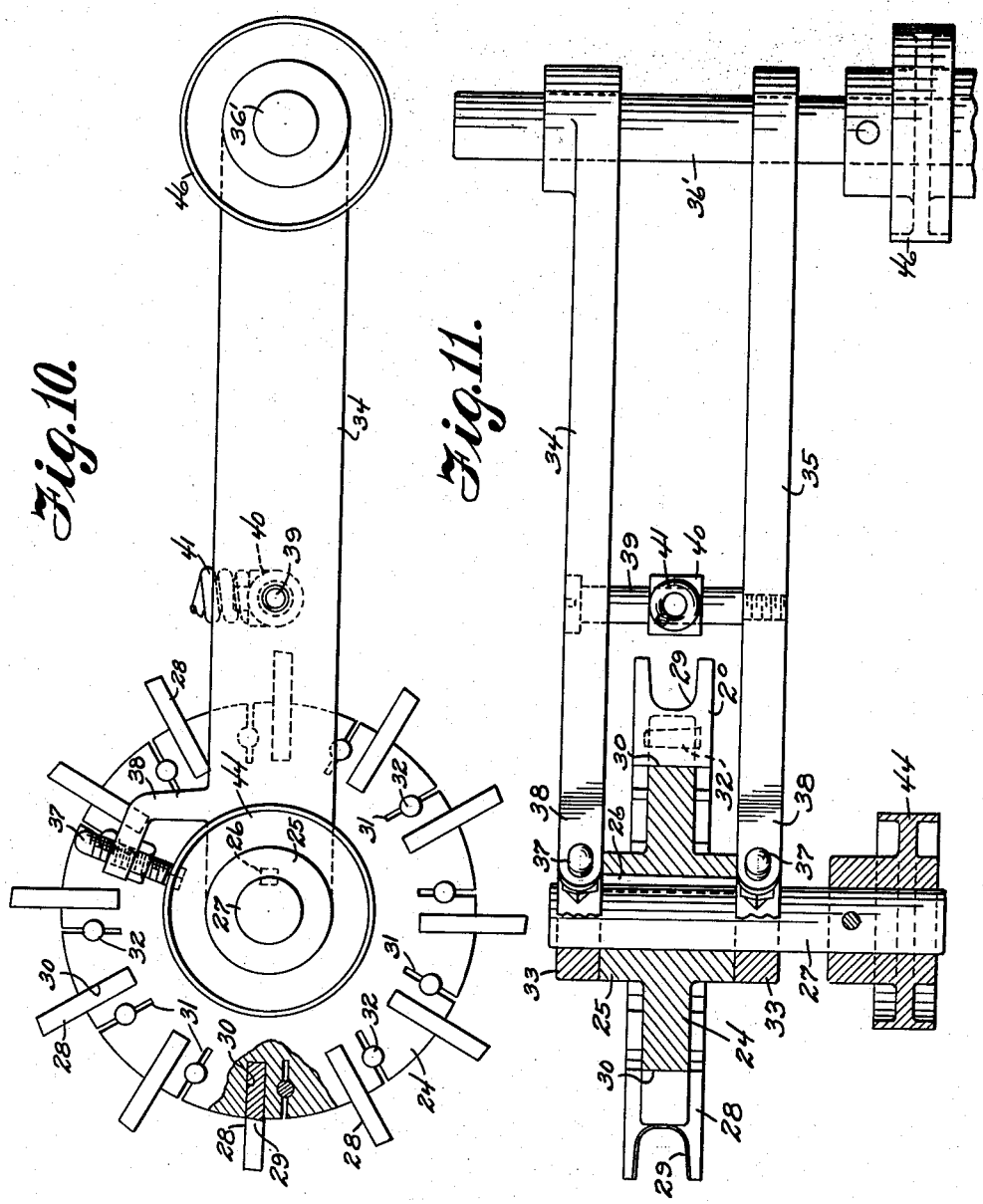

Patented Dec. 1, 1953

2,661,038

UNITED STATES PATENT OFFICE 2,661,038

MACHINE FOR MAKING HAMMER HANDLES

Perry L. Goins, Salem, Va.

Application February 21, 1949, Serial No. 77,663

3 Claims. (Cl. 144—144)

The present invention relates to the general class of woodworking machines and more specifically to an improved machine for making hammer handles and other similar wood products. The invention is physically embodied in a power operated machine preferably with plural operating units including endless work-feeding conveyors having templets, patterns or forms for the finished product, and shaping mechanisms having dual rotary cutters mounted in swinging frames. The machine includes a minimum number of parts that may be manufactured with facility at low cost of production, and the parts may be assembled with convenience to provide an appliance that is simple in construction and operation, smooth-working, and efficient in the performance of its functions.

The invention consists in certain novel features of construction and combinations and arrangements of parts as will hereinafter be described and more particularly pointed out in the appended claims.

In the accompanying drawings I have illustrated a complete example of a physical embodiment of my invention in which the parts are combined and arranged in accord with one mode I have devised for the practical application of the principles of the invention; it will however be understood that changes and alterations are contemplated and may be made in these exemplifying drawings and mechanical structures within the scope of my claims without departing from the principles of the invention.

Figure 2 is a top plan view; and Figure 3 is an end view as seen from the left in Fig. 1.

Figure 4 is a sectional view at line 4—4 of Fig. 1.

Figure 10 is a side elevation, partly in section, showing one of the four rotary cutters with its swinging frame; and Figure 11 is a partial plan and partial section of the structure in Fig. 10.

Figure 1:
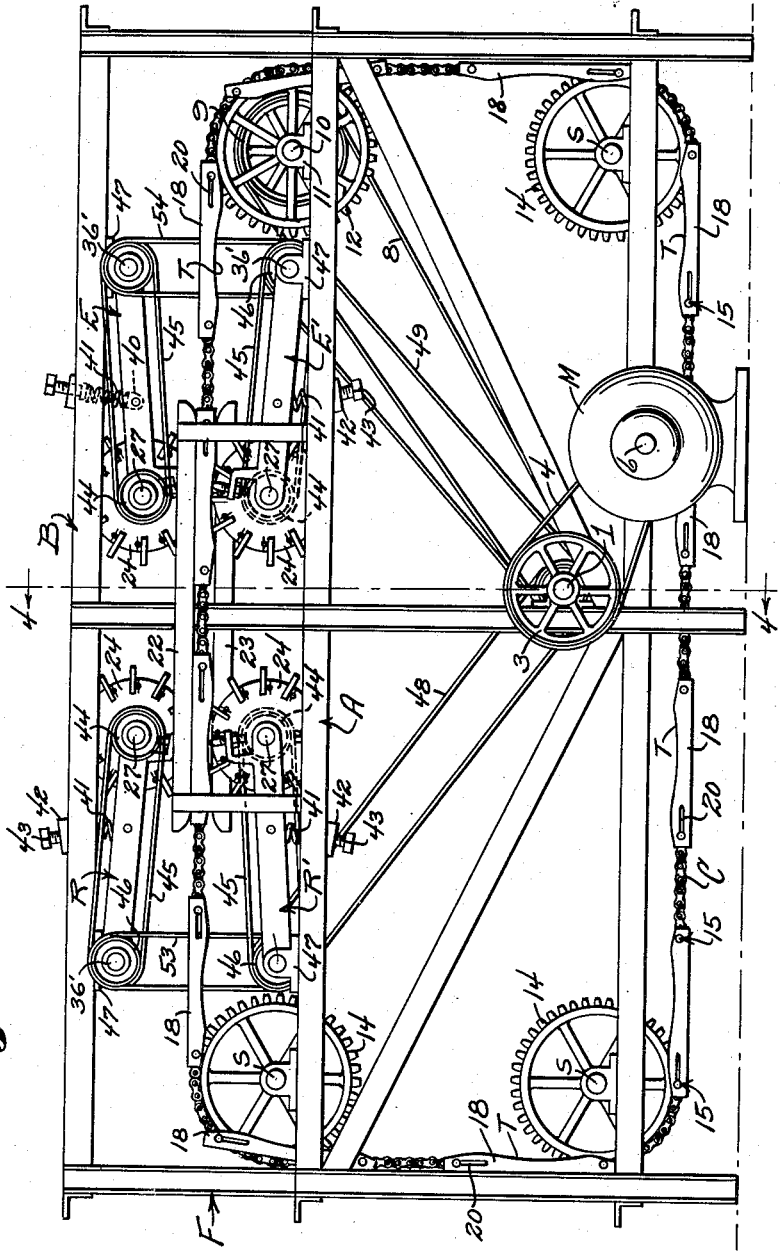
Figure 1 is a view in side elevation of a machine in which my invention is embodied.
Figure 5:
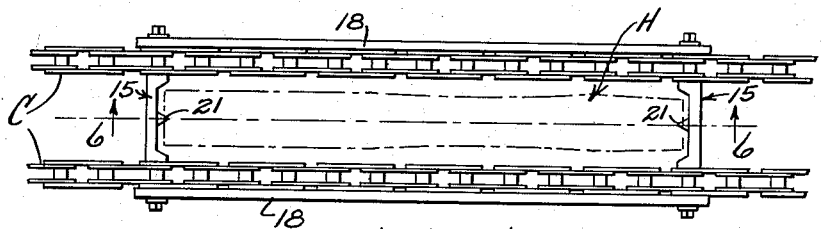
Figure 5 is a plan view of a portion of an endless work conveyor, with one of the traveling work holders, templets, or forms.
Figure 6:
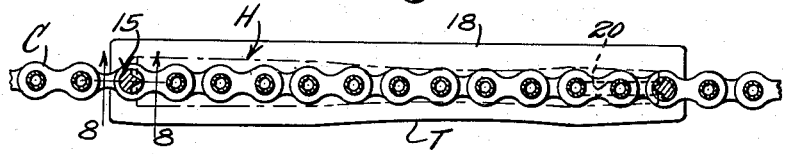
Figure 6 is a sectional view at line 6—6 of Fig. 5.

While the invention may readily be embodied in one or a number of operating units, each adapted to shape a succession of handles H from the lumber or stock, for convenience of illustration and description I have shown a motor operated machine having two units and a single motor M; and the main frame F is equipped with two laterally spaced and elevated shaped frames A and B.

Each unit is provided with an endless chain work conveyor or feeder that includes dual chains C and D, each carrying the work to dual rotary cutters, the conveyor and the cutters being operated from a central tranversely arranged power shaft 1 journaled in bearings 2, 2 of the main frame.

Shaft 1 is provided with a pulley 3 driven by belt 4 from a drive pulley 5 on the shaft 6 of the motor M, and power is transmitted from shaft 1 through a driving pulley 7 and belt 8 to a pulley 9 on a conveyor operating shaft 10 that is journaled in bearings 11 mounted on top of the main frame F.

The conveyor operating shaft 10 is equipped with dual sprocket wheels 12 and 13, for the complementary dual sprocket chains C and D, and these conveyor chains are guided around upper and lower idling sprockets 14 on shafts as S journaled in bearings of the main frame.

The pieces of work, stock, or handles H are carried by the endless conveyors in successively arranged work holders that form templets or patterns for shaping the handles, and these work holders are mounted upon the endless chains for carrying the work through the respective shaping mechanisms.

In Figures 5 through 9 one of the work holders is shown in detail with the handle H rigidly mounted between a pair of spaced and opposed cross bars 15 and 15' which bars form connecting link pins in the dual endless chains; and the journal ends of these cross bars, as 16, are mounted in bearing bushings 17 in the pivotal connections of the links.

Figure 2:
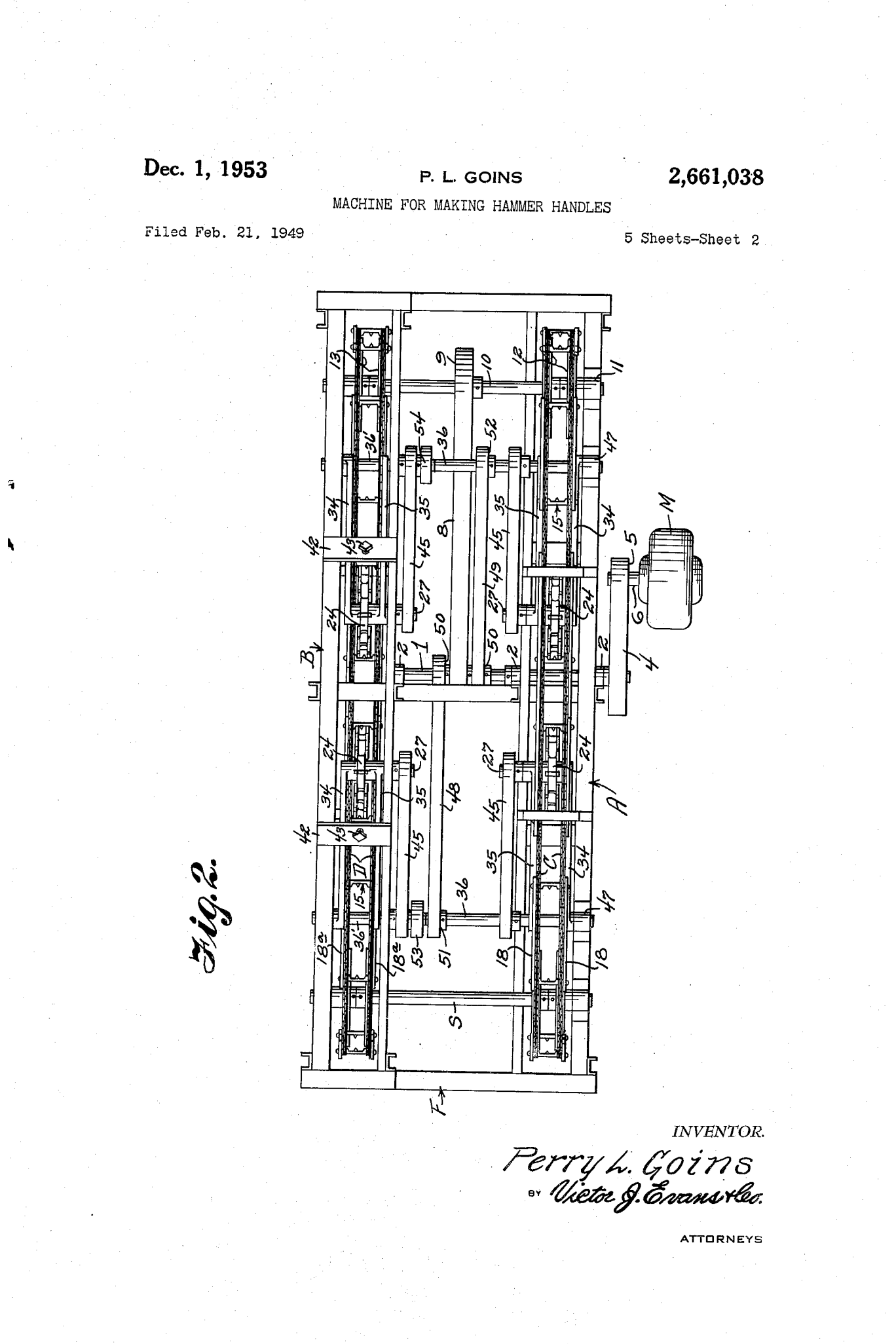

The outer ends of the cross bars, exterior of the chains are squared and fitted in sockets of the two frame plates 18 and 18a (as seen in Figs. 2 and 3) which are fastened by nuts 19, and each pair of plates forms a pattern or templet, having a dead center constantly in line with the plates, and provided with guiding or shaping edges T that coact with complementary means of the cutting mechanisms in shaping the handles H.

Figure 7:
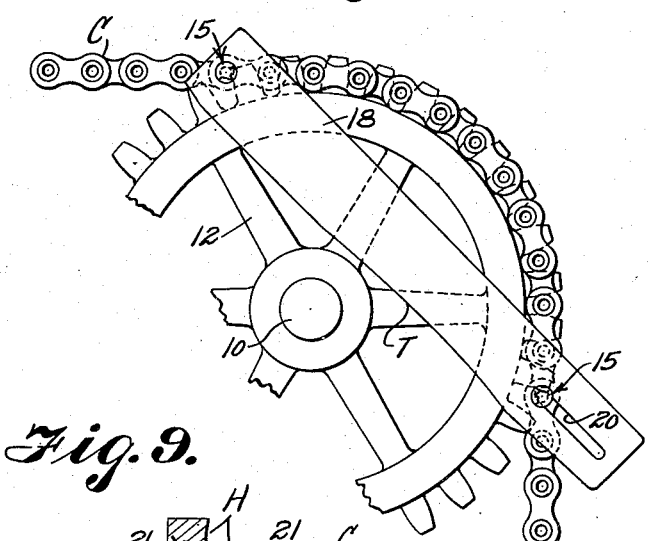
Figure 7 is a view of a portion of a work holder showing its movement around a supporting sprocket wheel.
Figure 8:
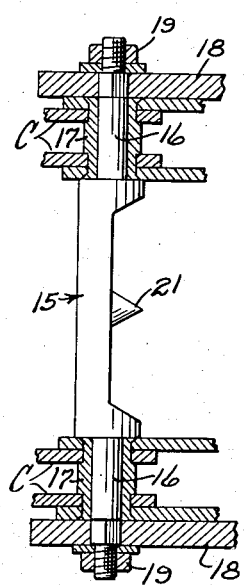
Figure 8 is an enlarged detail sectional view of parts of the work holder, at line 8—8 of Fig. 6.

To facilitate travel of the work holders around the supporting sprocket wheels of the conveyor chains, each plate is longitudinally slotted as at 20 to permit sliding movement of the journal ends of the cross bars, as indicated in Fig. 7.

Figure 9:
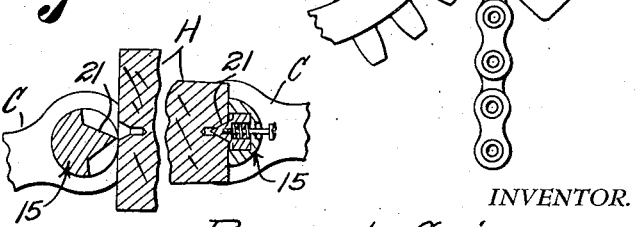
Figure 9 is a similar view showing how the work is placed in, or removed from the conveyor.

For clamping and retaining the handle in the work holder the complementary cross bars are cut away and flattened and fashioned with centering pins 21 and 21' which as seen in Fig. 9 impinge against and enter the ends of the stock or handle; pin 21' being spring pressed to facilitate clamping the work in the holder.

The two pointed pins 21 and 21' of the holder thus rigidly support the work or handle while it is being shaped, and the stationary guide rails 22 and 23 mounted on the frames A and B guide the work holders through the cutting mechanism.

The blank may be entered at the left end of A and when it reaches the right end of the frame it is removed and then entered in the left end of B conveyor for work on its opposite side.

The conveyors and the work holders carry the stock to one cutting mechanism mounted in frame A that includes tandem under cutters for a rough cut and a finishing cut; and the tandem cutters mounted in the other frame as B operate as over cutters for roughing and finishing the handle.

Thus, one tandem pair of rotary cutters is designed to swing upwardly to the work, while the other tandem pair is mounted to swing downwardly to the work, for roughing and finishing the handle. The construction and operation of the four cutters being quite similar, a description of one rotary cutter will suffice for all of them.

Each cutter includes a rotary disk or expanding head 24 as best seen in Figs. 10 and 11, and the hub 25 of the head is keyed at 26 on a rotary cutter shaft 27. The head is equipped with an annular series of circumferentially spaced bits or cutters having flat shanks 28 and bifurcated or U-shaped cutting edges 29 conforming to the desired shape of the handle. The shanks of these radial cutters are inserted and seated in peripheral sockets 30 of the head 24, and the expansible head of resilient material is cut out to form radial slots 31 between adjoining cutters. The walls of the slots are oppositely grooved to form seats for tapered spreader pins 32 that are driven into the grooved slots to expand or spread the resilient head and clamp the shanks of the cutters rigidly in place.

The cutter shaft 27 is journaled in bearings 33 of a swinging frame consisting of two spaced plates 34 and 35 that are journaled on a drive shaft 36 for the rotary cutter, and for coaction with the templet T of the work holder, this swinging cutter frame is equipped with a pair of guide pins or screws 37 (Figures 10 and 11) adjustably mounted in angular bosses or lugs 38 integral with the plates 34 and 35 of the swinging frame and retained in operative position in the path of the templets T of the traveling work holders.

Resilient means are provided for pressing the swinging frame and its rotary cutter to operative position, and the coacting pins and templets govern the movement of the rotary cutter in shaping the handle H as the work holder is guided past the rotary cutter.

For resiliently applying each rotary cutter to its working positions, a transversely arranged and headed bolt 39 is mounted in the plates of the templet frame or work holder, and the bolt is provided with an anchoring bracket or collar 40 for a spring 41; and the springs of the frames tend to press the frames and their cutters toward the travelling handle H.

As best seen in Fig. 1 the outer ends of the springs 41 are each attached to a stationary frame member by means of an anchoring block 42, and an adjusting bolt 43, and the bolt is adapted to adjust the tension of the spring, for swinging the cutter frame and to limit the swing of the frame.

In Fig. 1 the two swinging cutters at the left may be designed as R for a downwardly pressed cutter and R' for an upwardly pressed cutter, while the two right hand cutters E and E' are respectively pressed downwardly and upwardly, by their springs in accord with the specific arrangement of the springs with relation to the pivoted and swinging cutter frames.

The several cutters are operated by power transmitted from the central power shaft 1, and each cutter shaft is equipped with a driven pulley 44 over which a belt 45 passes from a drive pulley 46 on an operating shaft 36 journaled in bearings 47; and in Fig. 1 the two lower shafts 36' 36' of the under cutters R' and E' are operated respectively by belts 48 and 49 driven by pulleys 50 on the power shaft 1 and passing around pulleys 51 and 52 of the shafts 36'.

The operating shafts 36 36 of the tandem over-cutting rotary cutters R and E are revolved by power transmitted from the shafts 36' 36' through belt drives 53 and 54 having pairs of spaced pulleys on the shafts 36 and 36'. By the tandem arrangement of the rotary cutters, the first cutter operates to roughly shape the work or stock, and then the second cutter applies the finishing operation to the handle, and one pair of tandem cutters shapes one side of the handle; while the other pair of tandem cutters shapes the other side of the handle; thus providing an accurately shaped product according to the pattern or templet.

Having thus fully described my invention, what I claim as new and desire to secure by Letters Patent is:

1. In a rotary cutter of the swinging frame type the combination with a supporting frame having a pair of laterally spaced and elevated shaper frames, a power shaft journalled in said supporting frame transversely thereof adjacent the bottom thereof, upper and lower operating shafts journalled parallel to said power shaft in each shaper frame adjacent the top thereof, drive means connecting the power shaft to said lower operating shafts, and said lower operating shafts to the corresponding one of said upper operating shafts, upper and lower cutter frames respectively pivotally mounted on each upper and lower operating shafts, a cutter shaft journalled in the free end of each upper and lower cutting frame, drive means between each shutter shaft and its respective operating shaft, a rotor cutter rigid with each cutter shaft and the upper and lower rotary cutters being in vertical spaced alinement with each other, a pressure spring between each shaper frame and cutter frame for urging said cutters toward each other means limiting the approach of said cutters towards each other, means for feeding work between said upper and lower cutters and power transmission means operatively connected to said power shaft.

2. In a rotary cutter as in claim 1 wherein said means for feeding work comprises conveyor means mounted on said shaper frames and said supporting frame in the path of said cutters for conveying work to said cutters.

3. In a rotary cutter as in claim 1 wherein said means for feeding work comprises conveyor means mounted on said supporting frame and said shaper frame and an adjusted guide means is mounted on said shaper frame to guide work carried by said conveyor into the path of said rotary cutters.

PERRY L. GOINS.

References Cited in the file of this patent

UNITED STATES PATENTS

| Number | Name | Date |
| --- | --- | --- |
| 356,066 | Goehring | Jan. 11, 1887 |
| 385,125 | Lee | June 26, 1888 |
| 427,196 | Seymour | May 6, 1890 |
| 923,704 | Randall | June 1, 1909 |
| 935,333 | Tarbox | Sept. 28, 1909 |
| 1,010,645 | Lane | Dec. 5, 1911 |
| 1,356,726 | Lundquist | Oct. 26, 1920 |
| 1,551,178 | Strand | Aug. 25, 1925 |
| 1,615,088 | Klieber | Jan. 18, 1927 |
| 2,361,820 | Cromwell | Oct. 31, 1944 |
| 2,478,807 | Critchfield | Aug. 9, 1949 |

FOREIGN PATENTS

| Number | Country | Date |
| --- | --- | --- |
| 120,050 | Switzerland | Aug. 16, 1927 |